US006798840B1

(12) United States Patent
Kendig (10) Patent No.: US 6,798,840 B1
(45) Date of Patent: Sep. 28, 2004

(54) FAST SWITCHOVER OUTPUT PROTECTION

(75) Inventor: Stephen D Kendig, Menlo Park, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/410,177

(22) Filed: Sep. 30, 1999

(51) Int. Cl.[7] .................................................. H04B 3/00
(52) U.S. Cl. ........................ 375/257; 375/312; 375/344; 375/221; 375/352; 701/19; 701/20; 340/901
(58) Field of Search ................................. 375/257, 312, 375/344, 221, 352; 701/19, 20; 340/901

(56) References Cited

U.S. PATENT DOCUMENTS

| | | | |
|---|---|---|---|
| 5,983,298 A | * 11/1999 | Schultz et al. ............... | 710/302 |
| 6,115,517 A | * 9/2000 | Shiragaki et al. ............. | 385/24 |
| 6,177,809 B1 | * 1/2001 | Tonti et al. .................... | 326/83 |
| 6,259,978 B1 | * 7/2001 | Feely ............................ | 701/19 |
| 6,275,510 B1 | * 8/2001 | Koenig et al. ............... | 370/535 |

* cited by examiner

Primary Examiner—Stephen Chin
Assistant Examiner—Guillermo Munoz (57) ABSTRACT

The invention is a communication system having a series of output modules that provide continuous synchronization output signals. Each output module has a driver assembly has a driver output and a backup selector output that is capable of driving a failed next driver assembly. A sensor detects the failure of the driver output and generates a select signal in the failure state. A selector receives the driver output, a backup driver output, the select signal, and a select signal from the next driver assembly. The selector normally selects the driver output, but in response to a failure state from the select signal, isolates the failed driver output. The previous driver assembly transmits a backup selector output to the failed driver assembly to maintain a continuous driver output. The transformers are preferably placed on a separate card to reduce the thermal degradation of nearby electronics. As transformers rarely fail, replacing them when a card fails is wasteful. The separate transformer cards also can be shaped so that only transformer cards with the same output type can be placed next to one another. A transformer card with a dissimilar output will not plug in unless a slot is skipped. The driver assemblies are identical, only one type of driver assembly need be stocked. Fast protection switching, high output utilization and low power consumption are achieved in this invention.

20 Claims, 5 Drawing Sheets

FAST SWITCHOVER OUTPUT PROTECTION

FIELD OF INVENTION

The invention is directed towards telecommunication and data communication applications. In particular, the invention is directed towards providing a fast switchover protection of communication outputs in these applications.

BACKGROUND

A communication system is a network of central offices connected by high-speed fiber optic lines. A Cesium (Cs) clock or global positioning system (GPS) signal at each central office synchronizes the communications. Communications networks further branch from the central offices and use lower speed connections. A building integration timing system (BITS) or BITS clock also called a network synchronization supply unit (SSU), is an electronics box at the central office that produces a timing or synchronization output signal connected to all the other network transmission and switching equipment in the office. A SSU contains a series of plug-in electronics cards including: an information management card (IMC), two input track and hold (ITH) cards or clock cards, one clock card for redundancy, with input from a Cs clock or GPS, and a series of output cards. The IMC, clock cards, and output cards connect to a backplane in the SSU. The output cards receive timing signals from the clock cards. The output cards have a power supply, electronics to communicate to the clock cards via the backplane, and a driver circuit that drives a transformer to produce the synchronization output signal. The output cards can have different types of synchronization output signals, e.g. DS0 or composite clock (CC), DS1 or T1, RS-422, and E1. DS0 operates at 64 Kb/sec. DS1 operates at 1.544 Mb/sec. RS-422 operates at various frequencies. E1 operates at 2.048 Mb/sec. DS1 and DS0 are common output types in the United States. E1 is common in Europe. These precise synchronization output signals are received by the other network elements, such as add/drop multiplexers (ADM), which carry the actual transmitted signals or data, called traffic. The synchronization output signals ensure that all out going transmissions from the central office have the same average frequency as the rest of the network.

It is important in data and telecommunication systems that synchronization output signals continue without loss in the event of a failure of an output card. Failure of an output card includes not only the actual failure of the card but also the accidental removal of a functioning card by a user. Replacement of output cards while the SSU is operating is called 'hot swapping'.

N:1 is a prior art method of protecting outputs. There is one 'hot' spare output card for each type of output that can be switched in by a multiplexer if a failure occurs in one of the N output cards. Most slots in the SSU are filled with cards that have an output so there is a high utilization of outputs. For example, if the SSU has twenty slots for output cards and the MMC and two 'hot' spares occupy three, then there is an output utilization of 85%. Power efficiency is also about 85% since three out of the twenty cards consume power without producing an output. The switching is very slow because the multiplexer is an array of mechanical switches or relays. The switching time for the relays within the multiplexer is typically a few milliseconds. E1 output waveforms have a period of around 500 ns. This switching time results in the loss of several periods of output waveform. This is undesirable for most applications. The number of usable outputs is limited because a 'hot' spare must be kept for each output type. The switching increases in complexity for more than two output types. Only one output card is protected at a time, if another output card of the same output type fails before the first can be 'hot swapped', then that output signal is lost.

1:1 is another prior art method of output protection. There is one spare output card in a standby state for each output card. Half of the output cards in the SSU are not producing an output so there is only a 50% output utilization. Only the cards with outputs consume power so that the power efficiency is nearly 100%. The 1:1 arrangement provides fast switching and each output card is protected. The switching speed can be as fast as 500 ns or only one period of an E1 waveform.

1+1 is a third prior art method of output protection. This method is similar to the 1:1 except that the spare is 'hot'. The 1+1 method has a 50% output utilization. Since all the output cards are consuming power and only half are producing outputs, the power efficiency is around 50%. The switching is very fast and each output card is protected. It is possible for the switch over to be nearly instantaneous if the output card fails in a open state. If the output card fails in the closed or shorted state, then the output card will have to be isolated and this can take 500 ns.

Prior art output cards have transformers generating heat and increasing the temperature of the output card. This can lead to accelerated failures of the more temperature sensitive components. The transformers themselves are very robust and rarely fail, yet they are replaced along with the rest of the output card when it fails. This is wasteful and costly.

SUMMARY

The invention is a communication system having a series of output modules, each having a continuous synchronization output signal. Each output module has a driver assembly that has a driver output and a backup selector output that is capable of driving a failed next adjacent driver assembly. A sensor detects the failure of the driver or a backup driver output and generates a select signal in the failure state. A selector receives the driver output, the backup driver output, the select signal, and a select signal from the next adjacent driver assembly. The selector normally selects the driver output, but in response to a failure state from the select signal, the selector isolates the failed driver output. The previous adjacent driver assembly transmits a backup selector output to the failed driver assembly to maintain a continuous driver output. The first and the last output modules may be connected together so that each output module is protected.

Protection switching is fast and each of the N output modules is protected. Output utilization is very high for this synchronization supply unit (SSU). The adjacent output module must be of the same output type for the adjacent driver assembly to serve as protection, i.e. the driver is not capable of simultaneously supplying two different output types. For example, if there is a series of DS1 output modules, a slot must be left unused before installing a series of DS0 output modules. For a planned system with a total of twenty output modules of two output types, this is a minimal concern because the SSU will have a 90% output utilization even if the first and last output modules of each series are not connected together. In this case, the two backup output modules are in the standby state and not consuming power, power efficiency is nearly 100%.

In a preferred embodiment, a driver assembly contains the active circuitry and a transformer card contains the transformers. Placing the transformers on a separate card reduces the thermal degradation of nearby electronics. In addition, transformers rarely fail so replacing them when a card fails is wasteful. The separate transformer card allows for keying of the different output types in the invention. It is the transformer that determines the output type. The transformer cards are shaped so that only transformer cards with the same output type can be physically placed next to one another. A transformer card with a dissimilar output will not plug in unless a slot is skipped. The driver assemblies are identical and have a power supply, microprocessor, field programmable gate array (FPGA) and driver circuits. This novel driver assembly can drive a variety of synchronization output signals, replacing several types of conventional output cards. The invention allows for 'hot swapping' of driver assemblies. This makes replacement of failed drivers easy.

DETAILED DESCRIPTION OF THE PREFERRED EMBODIMENTS

Figure 1:
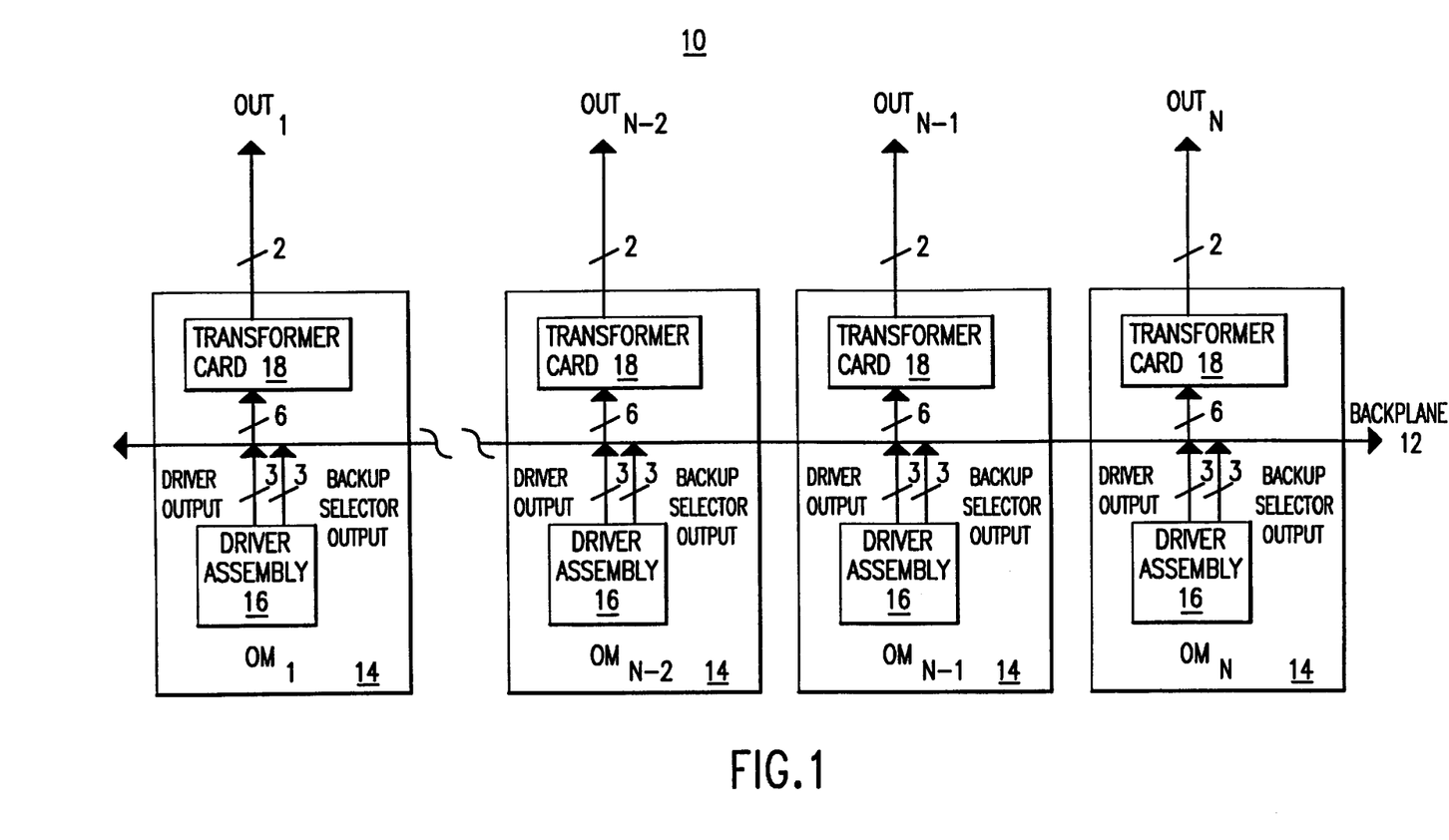
FIG. 1 is a block diagram of the preferred embodiment of the present invention.

FIG. 1 shows a preferred embodiment of the present invention. A series of N output modules 10 are connected via a backplane 12 interface. Each output module $OM_x$, 14 has a driver assembly 16 and a transformer card 18. Each transformer card 18 receives a six terminal input from the backplane 12 and generates a two terminal synchronization output signal $OUT_x$. Each driver assembly 16 produces a three terminal driver output that drives the transformer card 18 via a backplane 12 connection. Each driver assembly 16 also produces a three terminal backup selector output that connects to an adjacent output module 14 through the backplane 12 to create a daisy chain. Optionally, the backup selector output of the last output module 14 can connect to the first output module 14 to provide every synchronization output signal in the series with a backup selector output.

Figure 2:
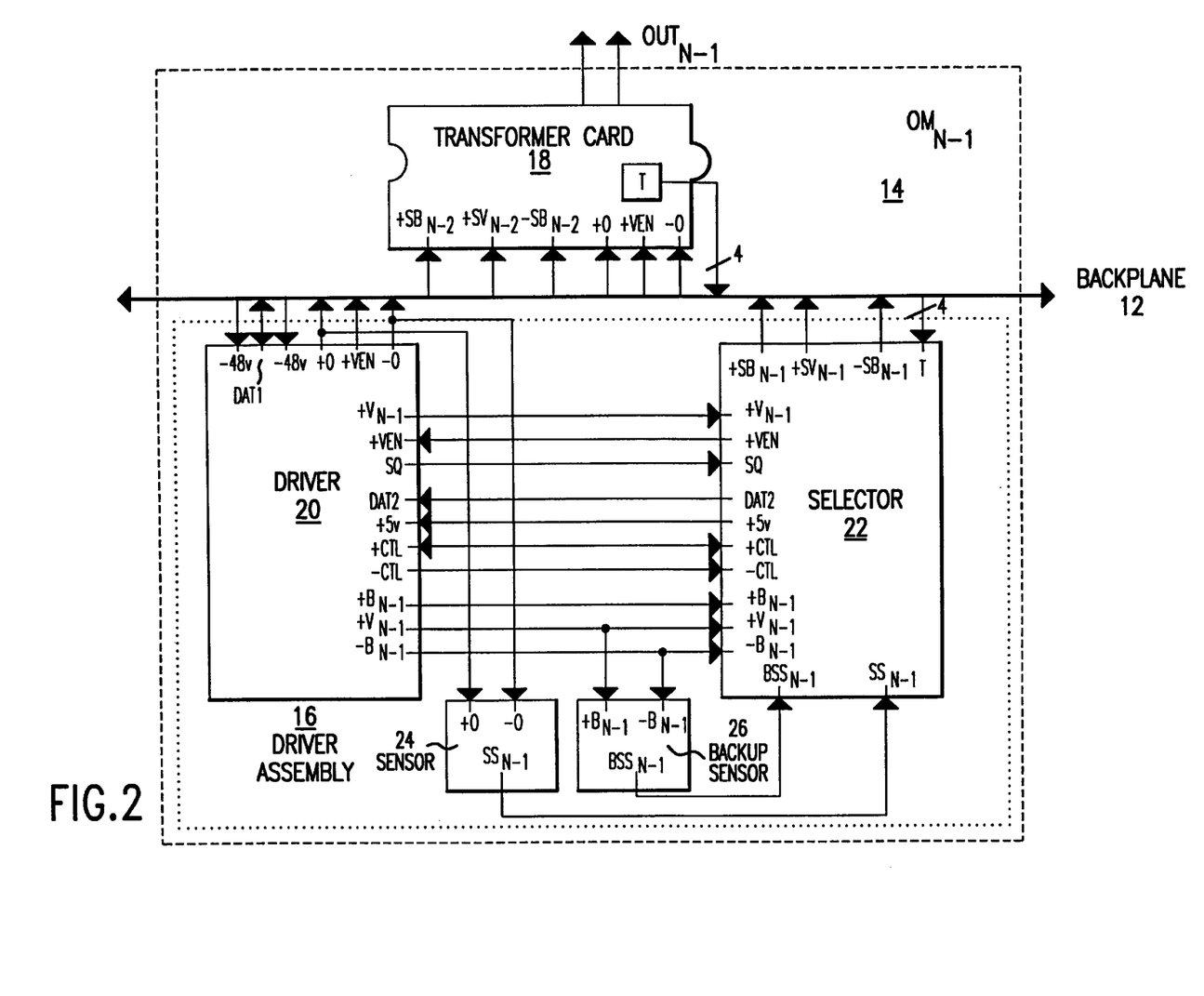
FIG. 2 is a block diagram of the output module of FIG. 1.

FIG. 2 shows a block diagram of a typical output module $OM_{N-1}$ 14 of FIG. 1. The driver assembly 16 has a driver 20, selector 22, sensor 24, and backup sensor 26. The driver 20 produces a three signal driver output of +O, +VEN, −O that connect to a transformer card 18 via the backplane 12. The driver 20 also connects to the backplane 12 through an interface DAT1 and −48 v inputs. The driver 20 produces a three signal backup driver output of $+B_{N-1}$, $+V_{N-1}$, $-B_{N-1}$ that connect to the selector 22. The driver 20 connects to the selector 22 with an interface DAT2, outputs $+V_{N-1}$, SQ, and +5 v, and receives inputs +VEN, +CTL, and −CTL. A sensor 24 receives driver signals +O, −O and sends a select signal $SS_{N-1}$ to the selector 22. A backup sensor 26 receives backup driver signals $+B_{N-1}$, $-B_{N-1}$ and sends a select signal $BSS_{N-1}$ to the selector 22. The selector 22 has a three signal backup selector output of $+SB_{N-1}$, $+SV_{N-1}$, $-SB_{N-1}$, and receives input T from the transformer card 18 via the backplane 12. The transformer card 18 has inputs $+SB_{N-2}$, $+SV_{N-2}$, $-SB_{N-2}$, from the previous adjacent output module $OM_{N-2}$ 14. The transformer card 18 generates a synchronization output signal $OUT_{N-1}$.

Either one sensor or two, as shown in FIG. 2, may be used. Failure of either set of signals indicates that the driver 20 has failed. If the driver output fails, the sensor 24 will change a select signal $SS_{N-1}$ from a normal state to a failure state. Similarly, if the backup driver output fails, the backup sensor 26 will change a backup select signal $BSS_{N-1}$ from a normal state to a failure state. When a failure is detected for either the driver or backup driver outputs, the previous adjacent output module $OM_{N-2}$ 14 transmits the backup selector output of $+SB_{N-2}$, $+SV_{N-2}$, $-SB_{N-2}$ via the backplane 12 to drive the transformer card 18. The previous adjacent output module $OM_{N-2}$ 14 then generates both synchronization output signals $OUT_{N-1}$ and $OUT_{N-2}$. The selector 22 also isolates the driver output +O, +VEN, and −O.

The driver 20 may receive a first and a second override signal from the backplane 12 via the interface DAT1. The driver 20 transmits this information to the selector 22 via the interface DAT2. The selector 22 then enables or disables the signal +VEN and $+SV_{N-1}$ of the driver 20 and selector 22.

Figure 3:
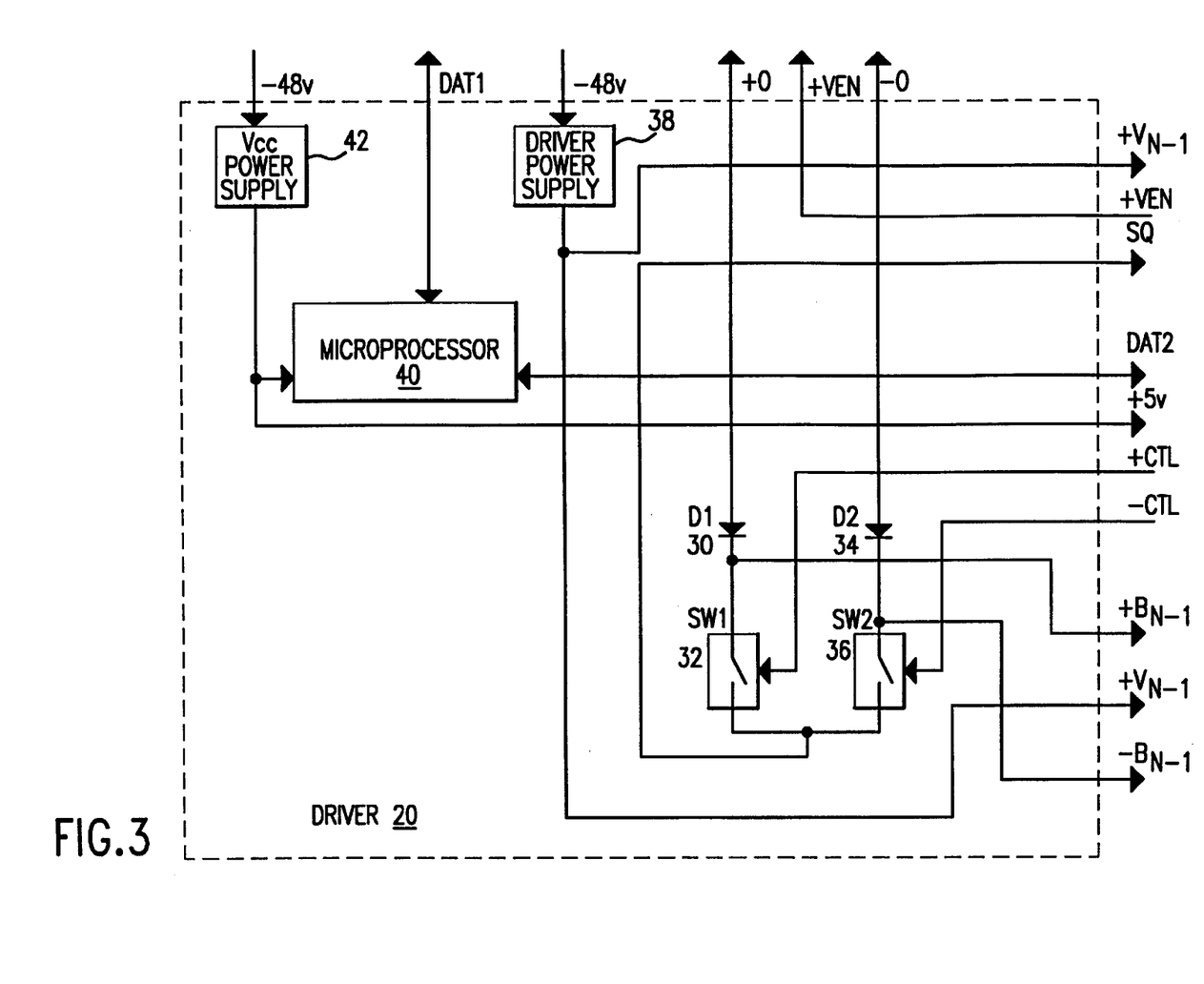
FIG. 3 is a schematic diagram of the driver of FIG. 2.

FIG. 3 shows a schematic diagram of a driver 20 from FIG. 2. The anode of a first diode D1 30 connects to the output +O and the cathode connects to the output $+B_{N-1}$. A switch SW1 32 connects between the output $+b_{N-1}$ and the output SQ. The anode of a second diode D2 34 connects to the input −O and the cathode connects to the output $-B_{N-1}$. A switch SW2 36 connects between the output $-b_{N-1}$ and the output SQ. A driver power supply 38 connects to the $+V_{N-1}$ outputs. A +CTL input connects to a control line of switch SW1 32. A −CTL input connects to a control line of switch SW2 36. The +VEN input and the output connect together. A microprocessor 40 transmits and receives data with the backplane 12 via the interface DAT1 and with the selector 22 via the interface DAT2. The microprocessor 40 also connects to a Vcc power supply 42. The Vcc power supply 42 generates +5 v. The driver and Vcc power supplies 38, 42 have −48 v inputs from the backplane 12.

In normal operation, closing switch SW1 32 allows current to flow from the +VEN output through the transformer card 18 to the +O output. A positive voltage pulse is induced in synchronization output signal $OUT_1$. Closing switch SW2 36 allows current to flow from the +VEN output through the transformer card 18 to the −O output. A negative voltage pulse is induced in synchronization output signal $OUT_{N-1}$.

If the next output module $OM_N$ 14 fails, closing switch SW1 32 allows current to flow from the $+V_{N-1}$ output through output module $OM_N$ 14 to the $+B_{N-1}$ output. A positive voltage pulse is induced in synchronization output signal $OUT_N$. Closing switch SW2 36 allows current to flow from the $+V_{N-1}$ output through output module $OM_N$ 14 to the $-BN_{N-1}$ output. A negative voltage pulse is induced in synchronization output signal $OUT_N$.

The first and second diodes D1, D2 30, 34 protect the transformer from reverse current and prevent the driver 20 from driving more than two transformers. Each driver 20 may contain numerous driver circuits that may operate from the one microprocessor 40 and the one set of power supplies 38, 42, only one driver circuit is shown for convenience. The switches SW1 32 and SW2 36 can be field effect transistors (FETs).

Figure 4:
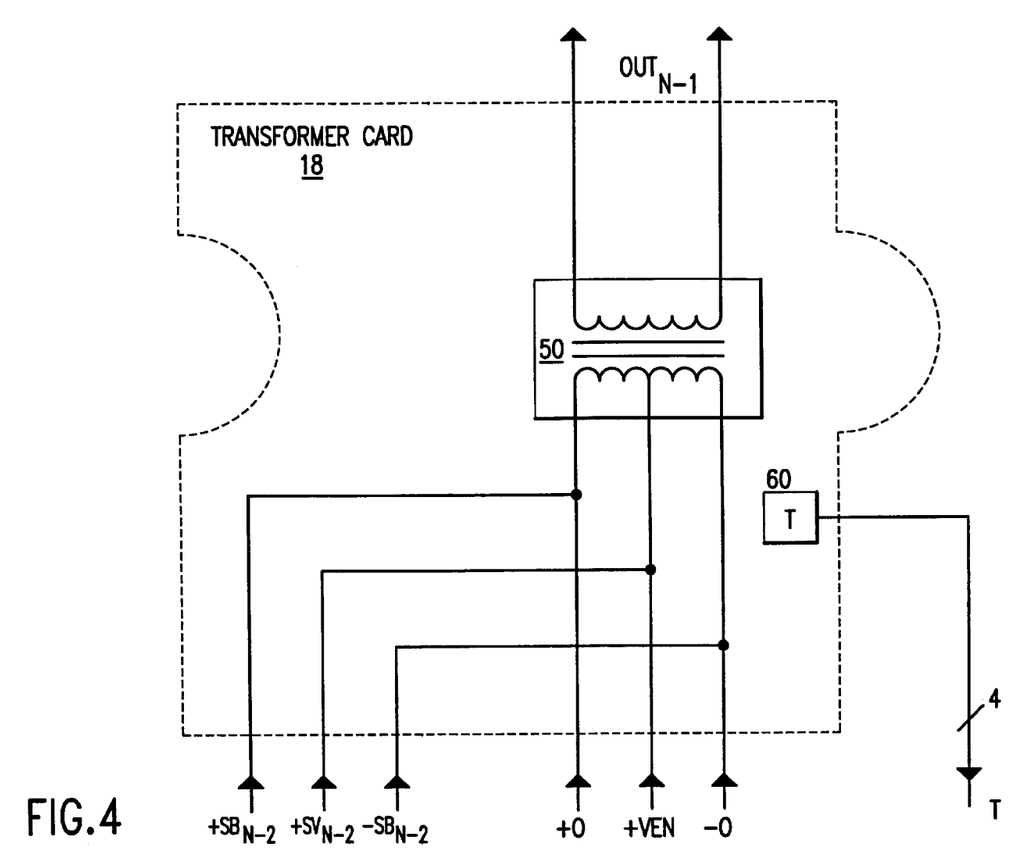
FIG. 4 is a schematic diagram of the transformer card of FIG. 2.

FIG. 4 shows a schematic diagram of a transformer card 18 shown in FIG. 1. A first terminal of a transformer 50 connects to inputs +O and $+SB_{N-2}$. A center tap of the transformer 50 connects to inputs +VEN and $+SV_{N-2}$. A second terminal of the transformer 50 connects to outputs −O and $-SB_{N-2}$. The transformer 50 generates synchronization output signal $OUT_{N-1}$. The transformer type T 60 connects to output T. While the transformer type T 60 may be stored in RAM, in the preferred embodiment, the transformer type T 60 is four signals, each may be grounded or left floating. The selector 22 reads the transformer type T 60 via the backplane 12. Each transformer card 18 contains at least one transformer 50.

The shape of the transformer card 18 ensures that it has the same transformer type T 60 as the adjacent transformer card 18 so that the adjacent driver 20 can provide the same driver output as backup. Alternatively, an electrical test can be performed to ensure the same transformer type of adjacent transformers and keyed transformer cards are not necessary.

Figure 5:
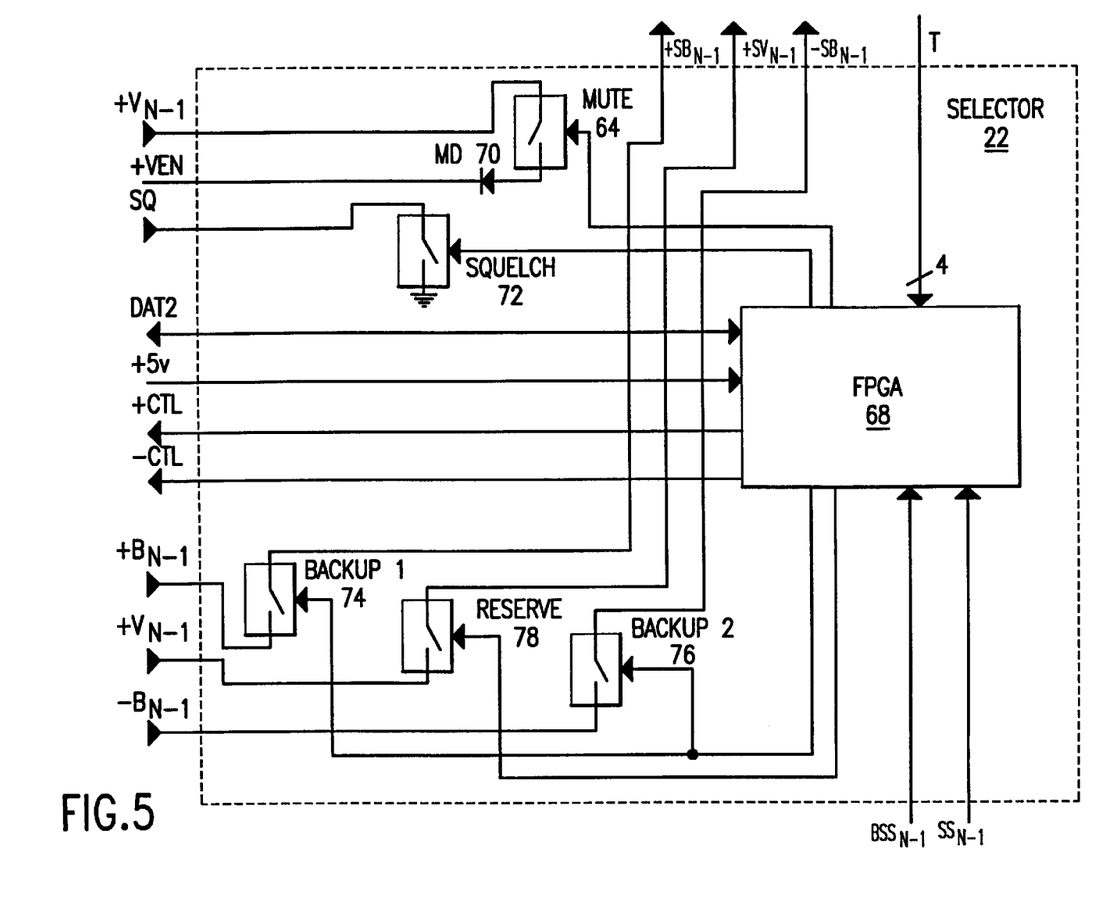
FIG. 5 is a schematic diagram of the selector of FIG. 2.

FIG. 5 shows a schematic diagram of the selector 22 shown in FIG. 2. A mute switch 64 connects between input $+V_{N-1}$ and the anode of a mute diode MD 70. The cathode of the mute diode MD 70 connects to output +VEN. A control line of the mute switch 64 connects to a field programmable gate array (FPGA) 68. A squelch switch 72 connects between the SQ input and ground. A control line of the squelch switch 72 connects to the FPGA 68. A backup 1 switch 74 connects between input $+B_{N-1}$ and output $+SB_{N-1}$. A backup 2 switch 76 connects between input $-B_{N-1}$ and output $-SB_{N-1}$. A control line from both backup switches, backup 1 74, backup 2 76, connect to the FPGA 68. A reserve switch 78 connects between input $+V_{N-1}$ and output $+SV_{N-1}$. A control line of the reserve switch 78 connects to the FPGA 68. The FPGA 68 receives and transmits data with the driver 20 via the interface DAT2. The FPGA 68 receives inputs from the transformer card 18 through port T, the sensor 24 through port $SS_{N-1}$, and the backup sensor 26 through port $BSS_{N-1}$. A +5 v input from the driver 20 powers the FPGA 68. The FPGA 68 transmits control signals to the driver 20 through ports +CTL and –CTL.

The FPGA 68, which contains the control logic for the selector 22, transmits the select signal $SS_{N-1}$ and backup select signal $BSS_{N-1}$ through the DAT2 interface to the previous adjacent output module $OM_{N-2}$ 14 through the backplane 12. Similarly, output module $OM_{N-1}$ 14 receives the state of the driver 20 of the next output module $OM_N$ 14. The FPGA 68 receives select signals $SS_N$ and backup select signal $BSS_N$ through the DAT2 interface. Based on these inputs, the FPGA 68 generates the control signals for all the switches in the selector 22. The FPGA 68 reads the transformer type T 60 and transmits the transformer type T 60 to the driver 20 via the interface DAT2. The driver 20 then transmits the transformer type T 60 to a clock card (not shown). The clock card transmits timing signals via the backplane 12 to the driver 20. The driver 20 transmits these timing signals to the FPGA 68 through the interface DAT2. Based on these timing signals and the transformer type T 60, the FPGA 68 generates the control signals +CTL, –CTL that are transmitted to the driver 20 and determine when switches SW1 32, SW2 36 open and close. The opening and closing of these switches 32, 36 determine the frequency of the driver output. For example, if the driver 20 is driving a transformer 50 with a DS1 output, then this frequency is 1.544 Mb/sec.

The FPGA 68 also receives a first and a second override signal, each having an enable and a disable state, from the driver 20 through the interface DAT2. A first override signal $OVRD_{N-1}$ is for the output module $OM_{N-1}$ 14 and a second override signal $OVRD_N$ is for the next adjacent output module $OM_N$ 14. The FPGA 68 logically ANDs the select signal $SS_{N-1}$, the backup select signal $BSS_{N-1}$, with the first override signal $OVRD_{N-1}$ to generate the mute control signal. If the override signal is enabled and the select and backup select signals are in the normal state, then the mute switch 64 will close. Otherwise, the mute switch 64 is open and the voltage +VEN is zero. With no voltage to the center tap of the transformer 50, the synchronization output signal $OUT_{N-1}$ is muted. When the first override signal $OVRD_{N-1}$ is disabled, the mute switch 64 is open. If the driver 20 fails, the mute switch 64 is also open to isolate the driver power supply 38 from the transformer card 18. This is a precaution in case the failure of the driver 20 includes a shorted driver power supply 38.

The FPGA 68 generates the control signal for the squelch switch 72 as the logical AND of the select signal $SS_{N-1}$ with the backup select signal $BSS_{N-1}$. If either the select signal $SS_{N-1}$ or the backup select signal $BSS_{N-1}$ is in the failure state, then the squelch switch 72 is open. Opening the squelch switch 72 removes the ground return from the driver 20 through input SQ. If the driver 20 fails, then the mute and squelch switches 64, 72 together, completely isolate the driver 20 from the transformer card 18.

The FPGA 68 generates the backup control signal as the logical NAND of the next adjacent output module $OM_N$ 14 select signal $SS_N$ with the backup select signal $BSS_N$. If either the select signal $SS_N$ or the backup select signal $BSS_N$ is in the failure state, then the FPGA 68 sends a backup control signal to close backup switches, backup 1 74, backup 2 76. The reserve control signal is generated as the logical AND of the backup control signal with the second override signal $OVRD_N$. If either the select signal $SS_N$ or the backup select signal $BSS_N$ is in the failure state and the second override signal $OVRD_N$ is enabled, then the reserve switch 78 is closed. In other words, $+V_{N-1}$ will only be supplied to $+SV_{N-1}$, if the next adjacent driver 20 fails and this driver 20 has an enabled output. Under these conditions, the output module $OM_{N-1}$ 14 completely drives the next adjacent transformer card 18 of output module $OM_N$ 14 with backup selector output $+SB_{N-1}$, $+SV_{N-1}$, and $-SB_{N-1}$. A failure light (not shown) and an optional audible alarm will indicate the failure to the user and a new driver assembly 16 can be 'hot swapped' all with no disruption of service of synchronization output signal $OUT_N$.

The select signal $SS_{N-1}$ and backup select signal $BSS_{N-1}$ may be sent from the FPGA 68 to the backplane 12 via the DAT2 interface, the microprocessor 40, and the DAT1 interface. The information management card (IMC, not shown) receives this data along with information from the other output modules 10. This data may be displayed on a computer monitor (not shown). In some instances, it may be desirable to prevent switch over to backup operation. For example, to prevent a failed driver 20 from backing up another failed driver 20, the FPGA 68 can be programmed not to allow the switch over to occur until the failed driver 20, serving as backup, is replaced. This can be accomplished by the logical AND of the reserve control signal, the select signal $SS_{N-1}$, with the backup select signal $BSS_{N-1}$. Also, the backup control signal can logically AND with the select signal $SS_{N-1}$, and with the backup select signal $BSS_{N-1}$.

The mute diode MD 70 protects the driver power supply 38 from reverse current. The backup switches backup 1 74 and backup 2 76, the mute switch 64, and the squelch switch 72 can be FETs. In the preferred embodiment, the backup switches, backup 1 74 and backup 2 76 are diodes. The backup control signal is unnecessary and switching is nearly instantaneous between backup driver output $+B_{N-1}$, $-B_{N-1}$ and backup selector output $+SB_{N-1}$, $-SB_{N-1}$. These diodes also protect the next adjacent transformer card 18 from reverse current when being backed up by output module $OM_{N-1}$ 14. The reserve switch 78 can be two back-to-back MOSFETs that provide a very low output impedance and a very high input impedance to keep any back flow of current out of output module $OM_{N-1}$ 14.

Using Schottky diodes as the first and second diode D1 30, D2 34 in the driver circuit protects the transformer 50 against reverse current and prevents the driver 20 from driving more than two transformers. This combination of Schottky diodes with two fast recovery diodes for the backup 1 and backup 2 switches 74, 76 provides for fast switching and keeps the voltage of synchronization output signal $OUT_N$ continuous. If the next adjacent driver 20 fails in an open state, then the switch to backup operation from output module $OM_{N-1}$ 14 is nearly instantaneous. If the next adjacent driver 20 fails in a closed or shorted state, then the switch to backup operation may take 500 ns. In normal operation, the magnitude of the output pulses is twice the difference of $+V_{N-1}$ minus two Schottky diode drops or $2|+V_{N-1}-0.61|$ volts. In failure mode operation, the magnitude of the output pulses is twice the difference of $+V_{N-1}$ minus one fast recovery diode drop or $2|+V_{N-1}-0.61|$ volts. The higher forward voltage drop across the fast recovery diode than the Schottky diode also prevents current sharing during normal operation. If Schottky diodes are used for backup 1 and backup 2 switches 74, 76 rather than fast recovery diodes, the current will flow equally between the driver switches 32, 36 of the output module $OM_{N-1}$ 14 and the output module $OM_N$ 14. This shared operation is completely acceptable, but it complicates the failure detection by the sensor 24 and reduces the reliability of the diodes used as backup switches 74, 76. When diodes are used for backup switches 74, 76, it is desirable to use both the sensor 24 and the backup sensor 26. This arrangement detects failures of the diodes used as backup switches 74, 76 that would otherwise go undetected. When backup switches 74, 76 are used, it is possible to periodically open the switches to uncouple the individual drivers and ensure that each is functioning properly, which can not be done when diodes are used.

When diodes are used for the backup switches 74, 76, the backup sensor 26 inputs can be connected to the backup selector signals $+SB_{N-1}$, $-SB_{N-1}$. The sensor 24 and backup sensor 26 may convey the driver signals $+O$, $-O$ and backup selector signals $+SB_{N-1}$, $-SB_{N-1}$ to the FPGA 68, which compares these signals to the control signals $+CTL$, $-CTL$. Control logic on the FPGA 68 can determine if there is a failure. A set of sensor isolation diodes (not shown) may be inserted on the driver and backup selector outputs between the sensor 24 and backup sensor 26 junctions and the backplane 12. The sensor isolation diodes serve to isolate the sensor 24 and backup sensor 26 from the previous and the next driver assemblies 16, so that the failure of the driver assembly 16 may be detected.

The present invention is an elegant solution to achieve modular high performance protection communication outputs. The invention combines utility, speed, and power efficiency with improved heat dissipation, waste reduction, and economy. Ease of use is maintained. This invention can be applied to any situation where fast switching in an economical modular unit is desired.

I claim:

1. A communication system having continuous outputs, comprising:
    a series of N driver assemblies, where N is a positive integer $\geq 2$;
        each driver assembly, producing a continuous driver output, including,
            a driver having a driver output and also having a backup driver output,
            a sensor receiving the driver output and generating a select signal having a normal and a failure state, and
            a selector, receiving the driver and backup driver outputs and the select signal, producing a backup selector output; and
    wherein each driver assembly, further receiving a select signal from the next driver assembly in the series and a backup selector output from a previous driver assembly in the series.

2. A communication system, as defined in claim 1, wherein the last driver assembly receives a first select signal and a first driver assembly receives the last backup selector output.

3. A communication system, as defined in claim 1, each driver assembly further comprising a backup sensor, receiving the backup driver output, outputting a backup select signal that has a normal and a failure state, to the selector and the selector of the previous driver assembly.

4. A communication system, as defined in claim 1, the selector of each driver assembly further comprising:
    a backup switch, connected between the backup driver and the backup selector outputs, receiving the select signal of the next driver assembly;
    when the select signal of the next driver assembly is in the normal state, the backup switch is open; and
    when the select signal of the next driver assembly is in the failure state, the backup switch is closed.

5. A communication system, as defined in claim 4, the selector of each driver assembly further comprising:
    a squelch switch, connected between the driver and continuous outputs, receiving the select signal;
    when the select signal is in the normal state, the squelch switch is closed; and
    when the select signal is in the failure state, the squelch switch is open.

6. A communication system, as defined in claim 5, wherein the backup switch of the selector of each driver assembly comprises at least one diode.

7. A communication system, as defined in claim 6, wherein the diode is selected from a group consisting of fast recovery and Schottky diodes.

8. A communication system, as defined in claim 5, the selector of each driver assembly further comprising:
    a mute switch, connected between a driver power supply and the continuous output, receiving an override signal that has an on and an off state;
    when the override signal is on, the mute switch is closed; and
    when the override signal is off, the mute switch is open.

9. A communication system, as defined in claim 8, the selector of each driver assembly further comprising:
    the mute switch, further receiving the select signal;
    when the override signal is on, the mute switch state corresponds to the select signal state.

10. A communication system, as defined in claim 5, the selector of each driver assembly further comprising:
    a reserve switch, connected between a driver power supply and the backup selector output, receiving the select signal of the next driver assembly:
    when the select signal of the next driver assembly is in the normal state, the reserve switch is open; and
    when the select signal of the next driver assembly is in the failure state, the reserve switch is closed.

11. A communication system, as defined in claim 10, the selector of each driver assembly further comprising:
    the reserve switch, further receiving a next override signal that has an on and an off state;

when the next override signal is off, the reserve switch is open; and when the next override signal is on, the reserve switch state corresponds to the state of the select signal of the next driver assembly.

12. A communication system, as defined in claim 11, the selector of each driver assembly further comprising:

a mute switch, connected between a driver power supply and the continuous output, receiving an override signal that has an on and an off state and the select signal;

when the override signal is off, the mute switch is open;

when the override signal is on, the mute switch state corresponds to the select signal state.

13. A communication system, as defined in claim 5, the selector of each driver assembly fiercer comprising:

a next backup sensor, receiving the backup driver output of the next driver assembly, outputting a next backup select signal that has a normal and a failure state, to the backup switch;

when the next backup select signal is in the failure state, the backup switch is closed; and when the next backup select signal is in the normal state, the backup switch state corresponds to the state of select signal of the next driver assembly.

14. A communication system, as defined in claim 13, the selector of each driver assembly further comprising:

a backup sensor, receiving the backup driver output, outputting a backup select signal that has a normal and a failure state, to the squelch switch;

when the backup select signal is in the failure state, the squelch switch is open; and when the backup select signal is in the normal state, the squelch switch state corresponds to the select signal state.

15. A communication system, as defined in claim 14, the selector of each driver assembly further comprising:

a mute switch, connected between a driver power supply and the continuous output, receiving an override signal that has an on and an off state, the select and the backup select signals;

when the override signal is off, the mute switch is open; and when the override signal is on and the select and backup select signals are in the normal state, the mute switch is closed; and when the override signal is on and one of the select and backup select signal is in the failure state, the mute switch is open.

16. A communication system, as defined in claim 14, the selector of each driver assembly further comprising:

a reserve switch, connected between a driver power supply and the backup selector output, receiving the select signal of the next driver assembly and next backup select signal;

when the select signal of the next driver assembly and next backup select signal are in the normal state, the reserve switch is open; and when one of the select signal of the next driver assembly and next backup signal is in the failure state, the reserve switch is closed.

17. A communication system, as defined in claim 16, the selector of each driver assembly further comprising:

a reserve switch, further receiving a next override signal that has an on and an off state;

when the next override signal is off, the reserve switch is open;

when the next override signal is on and the select signal of the next driver assembly and next backup select signal are in the normal state, the reserve switch is open; and when the next override signal is on and one of the select signal of the next driver assembly and next backup select signal is in the failure state, the reserve switch is closed.

18. A communication system, as defined in claim 1, further comprising:

N transformer circuits, wherein each transformer circuit receives the corresponding continuous output and generates a respective continuous communication synchronization output signal of one type.

19. A communication system, as defined in claim 18, wherein the type of the communication synchronization output signal is selected from a group consisting of DS0, DS1, RS-422, and E1.

20. A communication system, as defined in claim 18, further comprising:

N circuit boards, each having a shaped edge keyed to allow only transformer circuits of the same output type to be adjacent, the transformer circuit is mounted on the corresponding circuit board.

* * * * *